Dec. 25, 1962

R. SONNIER 3,069,762

ALIGNING TOOL

Filed April 11, 1960

INVENTOR.
RAIFE SONNIER
BY
*Harold M. Dixon*
HIS AGENT

Dec. 25, 1962 R. SONNIER 3,069,762
ALIGNING TOOL
Filed April 11, 1960 2 Sheets-Sheet 2

INVENTOR.
RAIFE SONNIER
BY
Harold M. Dixon
HIS AGENT

United States Patent Office 3,069,762
Patented Dec. 25, 1962

3,069,762
ALIGNING TOOL
Raife Sonnier, Ville Platte, La., assignor to Continental Oil Company, Ponca City, Okla., a corporation of Delaware
Filed Apr. 11, 1960, Ser. No. 21,523
7 Claims. (Cl. 29—271)

This invention relates generally to improvements in what may be considered inside aligning tools, and more particularly, but not by way of limitation, to an improved tool for aligning the wrist pin bores in a piston and connecting rod assembly for ease of installation of the wrist pin.

As it is well known in the art, the installation of wrist pins in large internal combustion engines is a difficult and time-consuming operation. On large engines, such as 400, 600 and 800 horsepower engines, the wrist pins are about five inches in diameter and the pistons and connecting rods are extremely heavy. Installation of a wrist pin in the wrist pin bores of such a piston and connecting rod is further complicated by reason of the small tolerance between the wrist pin and the connecting rod bushing, which is usually about .004 inch.

Several tools have been devised to facilitate the installation of wrist pins and, generally speaking, such prior tools do facilitate wrist pin installations. However, these prior tools utilize an aligning device for insertion in the wrist pin bore of either a piston or connecting rod (or both) and then a separate bar or aligning pin which is inserted both in the wrist pin and in the aligning tool to align the wrist pin with the respective wrist pin bores, prior to the time the wrist pin is driven into the wrist pin bores. As a result, a mechanic must keep track of at least two separate tools, and frequently several tools, for installing wrist pins. In addition to the difficulty involved in keeping track of several different tools between wrist pin installation operations, the several tools must be utilized in the proper order and in a precise manner in order to correctly install a wrist pin, which greatly complicates the work of the mechanic. Furthermore, the designs of wrist pins vary slightly from one manufacturer to another, and a bar or aligning pin which will fit in one wrist pin for a certain size engine will not always fit in other wrist pins made by different manufacturers—which requires a mechanic to maintain several different designs of aligning pins if he utilizes the aligning tools which have been used heretofore.

The present invention contemplates a novel tool for facilitating the installation of wrist pins which comprises a single unit wherein the various parts or elements of the unit remain in assembly even when the tool is not in use. The tool comprises a plurality of elongated guides which may be inserted as a unit into the wrist pin bores of a connecting rod and piston assembly; whereupon the guides are wedged outwardly equal distances to engage the walls of the wrist pin bores and precisely align the wrist pin bores. When these bores are aligned, the wrist pin is merely driven lengthwise into the bores to properly install the wrist pin and simultaneously remove the tool from the wrist pin bores. Before the tool is inserted in another set of wrist pin bores, the guides are collapsed to such a position that their outer edges define a cylinder having a diameter substantially less than the diameter of the wrist pin bores, such that the tool is easily inserted in the new set of wrist pin bores for a subsequent aligning operation.

An important object of this invention is to facilitate the installation of wrist pins in piston and connecting rod assemblies, and particularly in piston and connecting rod assemblies of relatively large engines.

Another object of this invention is to install a wrist pin with use of a single aligning tool.

A further object of this invention is to provide a tool for aligning the wrist pin bores of a piston and connecting rod assembly for ease of installation of a wrist pin, wherein the tool may be inserted in the respective wrist pin bores and expanded to align the bores in a minimum of time and with a maximum of efficiency.

Another object of this invention is to provide a tool for aligning the wrist pin bores of a piston and connecting rod assembly which will remain in assembly as a unitary tool when removed from the wrist pin bores and which may be easily collapsed to a diameter less than the diameter of the wrist pin bores prior to a subsequent aligning operation.

A still further object of this invention is to provide a tool for aligning the wrist pin bores of a piston and connecting rod assembly which is simple in construction, may be economically manufactured and which will have a long service life.

Other objects and advantages of the invention will be evident from the following detailed description, when read in conjunction with the accompanying drawings which illustrate my invention.

Figure 3:
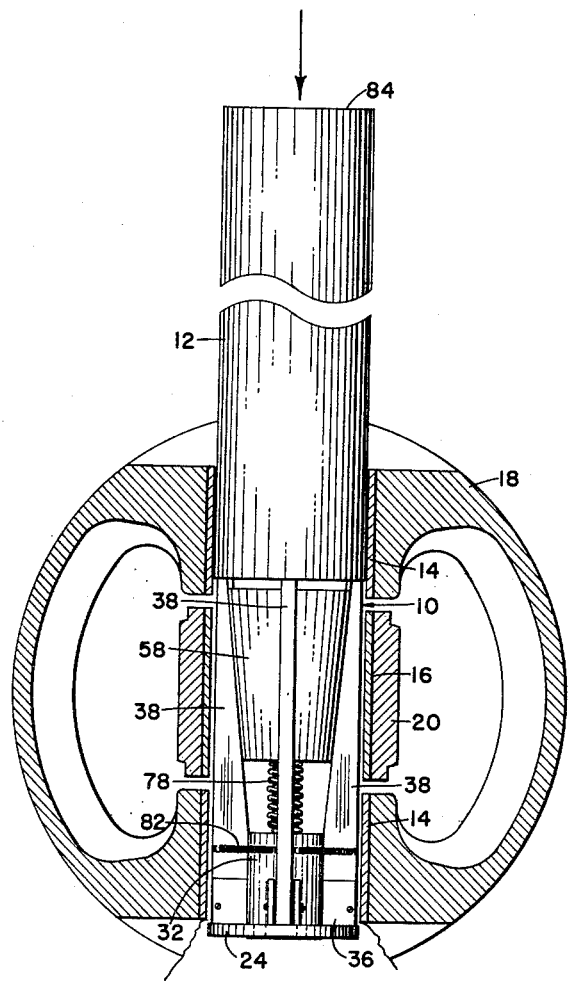
FIGURE 3 is a longitudinal sectional view taken through the wrist pin bores of a piston and connecting rod assembly, illustrating use of the tool of this invention in the installation of a wrist pin.

Referring to the drawings in detail, and particularly FIG. 3, reference character 10 generally designates a tool constructed in accordance with this invention which, as indicated above, was devised for installing a wrist pin 12 in the wrist pin bushings 14 and 16 of a piston 18 and connecting rod 20 assembly. The bushings 14 and 16 define what are sometimes called "wrist pin bores" herein.

The tool 10 (see FIGS. 1 and 2) comprises an elongated shaft 22 having a diameter substantially less than the inner diameters of the wrist pin bushings 14 and 16 and having a length sufficient to extend through one of the bushings 14, the bushing 16, and through a portion of the other bushing 14. A plate 24 is rigidly secured on one end 26 of the shaft 22, as by providing an aperture 28 in the central portion of the plate 24 and securing the end 26 of the shaft in the aperture 28 by suitable welding material 30. It may also be noted that the plate 24 preferably has an outer diameter slightly less than the inner diameters of the bushings 14 and 16 to facilitate movement of the plate 24 through the bushings in the event this is desirable during use of the tool.

Figure 2:
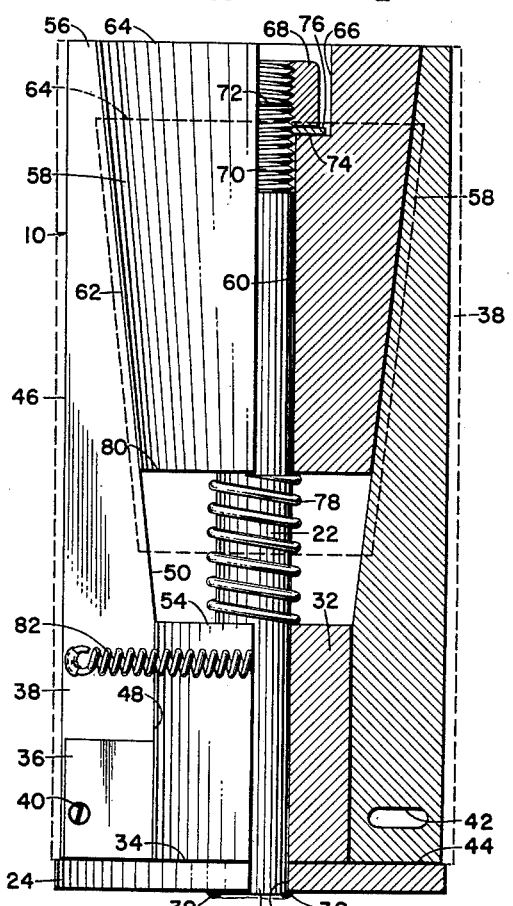
FIGURE 2 is a side elevational view of the tool shown in FIG. 1, with a portion of the tool being shown in section (as illustrated by the line 2—2 in FIG. 1) to illustrate details of construction. The dashed lines shown in FIG. 2 illustrate operation of the tool.

A sleeve 32 is telescoped over the shaft 22 into contact with the face 34 of the plate 24. The sleeve 32 is preferably of a size to provide a sliding fit thereof on the shaft 22 and has a length substantially less than the length of the shaft 22. A plurality of plate-shaped braces 36 are rigidly secured around the sleeve 32 in circumferentially spaced relation and extend radially outward from the sleeve 32. The braces 36 are provided in pairs, with each pair of braces being utilized to slidingly secure an elongated centering guide 38 to the sleeve 32. To provide a proper aligning operation, as will be described, at least three of the centering guides 38 must be used, and it is preferred that these three guides be positioned in equally spaced relation around the sleeve 32 and shaft 22. A suitable bolt 40 extends through mating apertures in each pair of the braces 36 and through an elongated slot 42 in the respective guide 38. Each slot 42 extends radially with respect to the sleeve 32, such that each slot 42 may move over the respective bolt 40 and permit sliding movement of the guides 38 radially inward and outward with respect to the sleeve 32. Also, the bolts 40 and slots 42 are preferably located such that adjacent end 44 of each guide 38 is in contact with the face 34 of the plate 24 when the tool is assembled as shown in FIG. 2.

Figure 1:
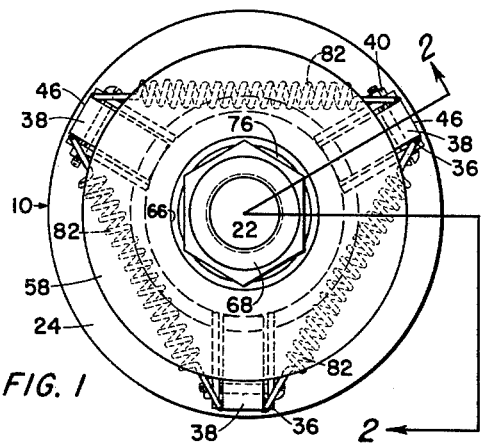
FIGURE 1 is an end elevational view of a tool constructed in accordance with this invention, with hidden portions of the tool being shown by dashed lines.

Each guide 38 has a length preferably slightly longer than the length of the portion of the shaft 22 protruding from the plate 24, for purposes which will be described. The outer face or edge 46 of each guide 38 may be flat or square, as illustrated in FIG. 1, or may be slightly rounded if desired. In any event, the outer faces 46 of the guides 38 define an imaginary cylinder having a diameter less than the diameters of the bushings 14 and 16 when the guides 38 are in their innermost positions in contact with the sleeve 32. However, the guides 38 may be moved radially outward to define an imaginary cylinder of a larger diameter for engaging the bushings 14 and 16 and aligning the bushings, as will be described below. The portion 48 of the inner face of each guide 38 opposite the sleeve 32 is straight to contact the entire length of the sleeve 32 when the guides 38 are in their innermost positions, as shown in solid lines in FIG. 2. However, the portion 50 of the inner face of each guide 38 extending from a point 52 even with the end 54 of the sleeve 32 is tapered outwardly toward the end 56 of the respective guide to cooperate with a tapered mandrel 58.

The mandrel 58 is provided with a bore 60 extending longitudinally through the center thereof of a size to slidingly receive the shaft 22, and the outer periphery 62 of the mandrel is tapered in the same direction and at the same angle as the tapered face 50 of each guide 38. In a preferred construction, the mandrel 58 is of a length to position the larger end 64 thereof substantially even with the ends 56 of the guides 38 when the guides 38 are in their innermost positions in contact with the sleeve 32 and in contact with the tapered outer periphery 62 of the mandrel. Thus, when the mandrel 58 is moved toward the sleeve 32 to wedge the guides 38 radially outward, the larger end 64 of the mandrel is positioned inwardly of the ends 56 of the guides 38, as illustrated by the dashed lines in FIG. 2. A counterbore 66 is formed in the larger end 64 of the mandrel 58 concentrically around the bore 60 to accommodate a suitable nut 68. The nut 68 is secured on threads 70 provided on the end 72 of the shaft 22 to engage the end 74 of the counterbore 66 and force the mandrel 58 toward the sleeve 32 when the nut is threaded on the shaft 22. A suitable washer 76 may be provided between the nut 68 and the end 74 of the counterbore, if desired.

In a preferred construction, an elastic member 78 is positioned between the end 54 of the sleeve 32 and the smaller end 80 of the mandrel 58 to constantly urge the sleeve 32 against the plate 24 and urge the mandrel 58 against the nut 68. The elastic member 78 may take any desired form, such as a helical compression spring telescoped around the shaft 22 and anchored against the mandrel 58 and sleeve 32. Also, suitable tension springs 82 (FIG. 1) are preferably anchored between the adjacent guides 38 to continuously urge the guides 38 radially inward into contact with the sleeve 32.

Operation

Preparatory to installing the wrist pin 12 in the bushings 14 and 16, the connecting rod 20 is manually positioned in the piston 18 in the general position illustrated in FIG. 3 to roughly align the bushings 14 and 16. The tool 10 is adjusted to its collapsed position as shown in solid lines in FIG. 2, and is then inserted lengthwise through one of the bushings 14, the bushing 16 and into a portion of the other bushing 14. In the collapsed position of the tool, an imaginary cylinder defined by the outer faces 46 of the guides 38 has a diameter substantially less than the diameters of the bushings 14 and 16, such that no particular difficulty is encountered in inserting the tool 10 in the bushings into the position shown in FIG. 3. A suitable wrench (not shown) is then applied on the nut 68 to thread the nut 68 onto the shaft 22. As the nut 68 applies a force on the end 74 of the counterbore 66, the mandrel 58 is forced toward the sleeve 32 to wedge the guides 38 radially outward by cooperation of the tapered outer periphery 62 of the mandrel and the tapered faces 50 of the guides. Threading of the nut 68 on the shaft 22 is continued until the outer faces 46 of the guides 38 grip the inner peripheries of the bushings 14 and 16; whereupon the bushings 14 and 16 will be precisely aligned. It may also be noted that the nut 68 will remain in the position in which it is threaded onto the shaft 22 to retain the guide 38 in engagement with the bushings 14 and 16.

The wrist pin 12 is then inserted into the partially open bushing 14 in the manner illustrated in FIG. 3 until the wrist pin contacts the ends 56 of the guides 38. A suitable hammer or sledge (not shown) is then brought into contact with the opposite end 84 of the wrist pin 12, as illustrated by the arrow in FIG. 3, to drive the wrist pin 12 into and through the bushings 14 and 16. As the wrist pin 12 is driven into the bushings, the force applied on the wrist pin is transmitted to the ends 56 of the guides 38 to simultaneously drive the tool 10 out of the bushings. Since the bushings 14 and 16 are precisely aligned, the wrist pin 12 may be easily driven into the bushings without damage to the bushings, and the tool 10 may be driven out of the bushings without scarring or otherwise damaging the bushings. It should also be noted that the force transmitted through the wrist pin 12 is applied to the guides 38, since the large end 64 of the mandrel is then inwardly of the ends 56 of the guides. Therefore, any relative movement between the mandrel 58 and the guides 38 caused by the jarring action of a hammer on the wrist pin will tend to collapse the guides, rather than expand the guides, which further assures that no damage to the bushings 14 and 16 will be caused by the guides.

When the tool 10 is removed, the nut 68 is partially unthreaded from the threads 70 on the shaft 22 back to the position shown in FIG. 2. During unthreading of the nut 68, the spring 78 continuously moves the mandrel 58 along the shaft 22 away from the sleeve 32 and holds the mandrel in contact with the washer 76. Also, the springs 82 move the guides 38 radially inward into contact with the sleeve 32 to completely collapse the tool 10 into the positions of the various parts illustrated in solid lines in FIG. 2; whereupon the tool 10 is ready for a subsequent wrist pin installation.

From the foregoing it will be apparent that the present invention will materially facilitate the installation of wrist pins in piston and connecting rod assemblies, and particularly in the larger sizes of piston and connecting rod assemblies. The tool of this invention remains in assembly during a complete wrist pin installation, such that a mechanic will only need to handle one aligning tool and keep track of a single aligning tool between wrist pin installations. However, the tool is easily dis-assembled if desired. The tool is easily collapsed to a diameter substantially less than the diameters of the wrist pin bores or bushings for easy insertion of the tool into the desired position in the connecting rod and piston assembly, and then the tool is easily expanded to grip the wrist pin bushings and precisely align the wrist pin bushings. With the wrist pin bushings in precise alignment, it is a simple operation to drive the wrist pin into the bushings and simultaneously remove the aligning tool. It will further be apparent that the present aligning tool is simple in construction, may be economically manufactured and will have a long service life.

Changes may be made in the combination and arrangement of parts or elements as heretofore set forth in the specification and shown in the drawings, it being understood that changes may be made in the precise embodiment disclosed without departing from the spirit or scope of the invention as defined in the following claims.

I claim:

1. A tool for aligning the wrist pin bores of a piston and connecting rod assembly for installation of a wrist pin therein, comprising a shaft; a plate rigidly secured on one end of the shaft and extending radially outward from the shaft; a sleeve telescoped onto the shaft adjacent the plate; at least three elongated guides slidingly secured to the sleeve in circumferentially spaced relation around the shaft for limited radial inward and outward movements with respect to the shaft; the faces of the guides adjacent the shaft being tapered outwardly from the sleeve to the ends thereof remote from the plate; said sleeve, guides and shaft being of a size for insertion thereof as a unit into the wrist pin bores when the guides are in their innermost positions; a tubular mandrel slidingly positioned on the shaft between the guides in spaced relation from the sleeve; the outer periphery of the mandrel being tapered at the same angle as the adjacent face of each guide and one terminus of the mandrel being in a plane with one terminus of each guide when said guides are in an inward position with respect to said shaft, and means for forcing the mandrel toward the plate when the tool is inserted in said wrist pin bores to wedge the guides radially outward into contact with the walls of said wrist pin bores and align said bores, whereby the wrist pin may be driven against one end of the tool to install the wrist pin and simultaneously remove the tool.

2. A tool for aligning the wrist pin bores of a piston and connecting rod assembly for installation of a wrist pin therein, comprising a shaft; a plate secured on one end of the shaft and extending radially outward from the shaft; a sleeve on the shaft adjacent the plate; at least three elongated guides slidingly secured to the sleeve in circumferentially spaced relation around the shaft for limited radial inward and outward movements with respect to the shaft; the faces of the guides adjacent the shaft being tapered outwardly from the sleeve to the ends thereof remote from the plate; said sleeve, guides and shaft being of a size for insertion thereof as a unit into the wrist pin bores when the guides are in their innermost positions; a tubular mandrel slidingly positioned on the shaft between the guides in spaced relation from the sleeve; the outer periphery of the mandrel being tapered at the same angle as the adjacent face of each guide and one terminus of the mandrel being in a plane with one terminus of each guide when said guides are in an inward position with respect to said shaft, and a nut threaded onto the shaft in a position to contact the end of the mandrel remote from the sleeve for forcing the mandrel toward the plate when the tool is inserted in said wrist pin bores to wedge the guides radially outward into contact with the walls of said wrist pin bores and align said bores, whereby the wrist pin may be driven against one end of the tool to install the wrist pin and simultaneously remove the tool.

3. A tool as defined in claim 2 wherein said sleeve is slidingly positioned on the shaft, and characterized further to include elastic means between the adjacent ends of the mandrel and sleeve urging the sleeve against the plate and the mandrel against the nut.

4. A tool for aligning the wrist pin bores of a piston and connecting rod assembly for installation of a wrist pin therein, comprising a shaft; a plate secured on one end of the shaft and extending radially outward from the shaft; a sleeve on the shaft adjacent the plate; at least three elongated guides slidingly secured to the sleeve in circumferentially spaced relation around the shaft for limited radial inward and outward movements with respect to the shaft, each of said guides having formed therein an elongated slot in a position opposite the sleeve and extending radially with respect to the sleeve, a brace extending radially outward from the sleeve adjacent each guide, a bolt secured to each of said braces in a position to extend through the elongated slot in the adjacent guide to slidably secure each guide to the sleeve for radial inward and outward movements; the faces of the guides adjacent the shaft being tapered outwardly from the sleeve to the ends thereof remote from the plate; said sleeve, guides and shaft being of a size for insertion thereof as a unit into the wrist pin bores when the guides are in their innermost positions; a tubular mandrel slidingly positioned on the shaft between the guides in spaced relation from the sleeve; the outer periphery of the mandrel being tapered at the same angle as the adjacent face of each guide, and one terminus of the mandrel being in a plane with one terminus of each guide when said guides are in an inward position with respect to said shaft, and means for forcing the mandrel toward the plate when the tool is inserted in said wrist pin bores to wedge the guides radially outward into contact with the walls of said wrist pin bores and align said bores, whereby the wrist pin may be driven against one end of the tool to install the wrist pin and simultaneously remove the tool.

5. A tool as defined in claim 4 wherein said slots and bolts are positioned to support the respective ends of the guides conterminous with the end of the sleeve adjacent the plate, whereby the guides are held against the plate when wedged outwardly by the mandrel.

6. A tool as defined in claim 4 characterized further to include tension springs interconnecting the guides around the sleeve continually urging the guides radially inward toward the shaft.

7. A tool as defined in claim 4 characterized further to include a helical compression spring around the shaft between the adjacent ends of the sleeve and mandrel, and tension springs secured to the guides in directions to urge the guides radially inward toward the shaft.

References Cited in the file of this patent

UNITED STATES PATENTS

| | | |
|---|---|---|
| 291,282 | Blue | Jan. 1, 1884 |
| 640,524 | Bartels | Jan. 2, 1900 |
| 1,448,528 | Elliott | Mar. 13, 1923 |
| 1,772,692 | Stevenson | Aug. 12, 1930 |